United States Patent [19]

Chu

[11] Patent Number: 5,040,861

[45] Date of Patent: * Aug. 20, 1991

[54] OPTICAL SCANNER

[75] Inventor: Ching Chu, Mississauga, Canada

[73] Assignee: Optical Recording Corporation, Toronto, Canada

[ * ] Notice: The portion of the term of this patent subsequent to Jul. 9, 2008 has been disclaimed.

[21] Appl. No.: 388,376

[22] Filed: Aug. 2, 1989

[51] Int. Cl.⁵ .................. G02B 26/08; G11B 7/00
[52] U.S. Cl. .................... 359/17; 369/44.11; 369/110; 359/211; 359/212
[58] Field of Search ............ 350/6.1, 6.2, 6.3, 6.4, 350/6.5, 3.7, 254, 3.71; 369/44.11–44.12, 44.14, 44.17–44.23, 44.28, 110

[56] References Cited

U.S. PATENT DOCUMENTS

| | | |
|---|---|---|
| 3,501,586 | 3/1970 | Russell ................... 369/44 |
| 3,624,284 | 11/1971 | Russell ................... 369/44 |
| 3,795,902 | 3/1974 | Russell ................... 369/59 |
| 4,163,600 | 8/1979 | Russell ................... 350/6.7 |
| 4,428,643 | 1/1984 | Kay ....................... 350/3.71 |
| 4,538,882 | 9/1985 | Tanaka et al. .......... 350/255 |
| 4,557,564 | 12/1985 | van Rosmalen ........ 350/247 |
| 4,583,816 | 4/1986 | Kramer .................. 350/3.71 |
| 4,616,355 | 10/1986 | Kasahara ................ 369/45 |
| 4,650,294 | 3/1987 | Nanno et al. ........... 350/6.3 |
| 4,688,201 | 8/1987 | Towner et al. ......... 369/44 |
| 4,730,297 | 3/1988 | Ishibashi et al. ....... 369/110 |
| 4,773,062 | 9/1988 | Wada et al. ............ 369/44 |
| 4,794,580 | 12/1988 | Ikedo et al. ............ 369/44 |
| 4,844,568 | 7/1989 | Suzuki et al. .......... 350/6.2 |
| 4,861,144 | 8/1989 | Russell .................. 350/6.3 |

FOREIGN PATENT DOCUMENTS 2022265 11/1971 Fed. Rep. of Germany.
2203840 8/1973 Fed. Rep. of Germany.
2215076 10/1973 Fed. Rep. of Germany.
8601209.6 7/1989 Fed. Rep. of Germany.

OTHER PUBLICATIONS

German Patent 595,822, Feb. 10, 1932.
German Patent Abstract 55113018, Feb. 23, 1979.
Japanese Patent Abstract 63307419, Dec. 15, 1988.
Ishibashi et al., "High Speed Accessing Magneto-Optical Disk Drive", 1988, pp. 8–15, SPIE, vol. 899, Optical Storage Technology and Applications.

Primary Examiner—Paul M. Dzierzynski
Assistant Examiner—James Phan
Attorney, Agent, or Firm—Fleit, Jacobson, Cohn, Price, Holman & Stern

[57] ABSTRACT

An optical scanner has a light distributor rotating about an axis spaced from but parallel to the optical axis of at light source. Lenses are mounted on a carrier that rotates about the optical axis. The distributor and carrier rotate a the same angular velocity and are arranged so that the lens and associated distributor move across the media at the same time. By rotating the lens about the optical axis, the scanning beam remains in the central zone of the lens as it passes across the media.

14 Claims, 4 Drawing Sheets

OPTICAL SCANNER

BACKGROUND OF THE INVENTION

The present invention relates to an optical scanning device.

Optical scanners are used in a wide variety of applications to convert information that appears as changes in light intensity into electrical signals and vice versa. The information may be in analogue form but one of the most demanding applications is the recordal and retrieval of digital data.

The recording and retrieval of data on an optical media in digital form provides significant advantages in terms of data storage density, permanence and retrievability. The most common form of data storage using digital optical recording techniques utilizes a record media in the form of a disk that is rotated beneath an optical head to record and/or read data on the media. This arrangement has enjoyed considerable success, particularly in the audio field, but does pose limitations in terms of the media format.

An alternate format that offers significant advantages in certain application areas is a card format in which the media is held stationery and the optical beam reading the media is moved or scanned across the media. This allows different formats and sizes of media to be used, most conveniently a format corresponding to that of the popular size of credit card.

Similarly, a continuous tape offers advantages in certain applications such as archival recording and very high data storage capabilities.

In order to attain high data rates and data densities, it is preferable to utilize a rotatable scanner that causes an optical beam to translate relative to the record to read and record data. Such devices are disclosed in U.S. Pat. Nos. 3,501,586 issued Mar. 17, 1978; 3,624,284 issued Nov. 30, 1971; and 3,795,902 issued Mar. 5, 1974 all to Russell. In German Offenlegungshrift DOS 2,022,265 issued Nov. 18, 1971 published to Siemens, a scanning device is disclosed that utilizes a multi-faceted pyramid rotated about its central axis that serves to displace radially a light beam to an objective lens to scan a media. The device disclosed in this patent provides a simple yet effective distribution apparatus but as higher data density is required, conflicting mechanical and optical requirements introduce undesirable error in the scanning process. As the planar facet of the pyramid rotates, the point of impingement of the light beam on the face of the pyramid varies, causing the optical axis of the light beam to move across the aperture of the objective lens. This causes the beam to illuminate the outer zone of the lens during part of the scan with a resultant loss in quality of the optical system.

U.S. Pat. No. 4,163,600 issued Aug. 7, 1979 to Russell addresses these problems by introducing a back angle between the light beam and the pyramidal mirror that reduces movement of the light beam across the objective lens. A further approach to reducing the movement of the optical axis relative to the lens is shown in co-pending application Ser. No. 162,299 now U.S. Pat. No. 4,861,144 in which a field correction lens is used to generate a virtual image co-incident with the axis of rotation of the scanner. Each of these proposals does produce benefits but nevertheless at the high density and data rates required for optical storage devices, a simpler approach is preferable.

It is therefore an object of the present invention to provide an optical scanning device in which the above disadvantages are obviated or mitigated.

SUMMARY OF THE INVENTION

According to the present invention there is provided a rotary optical scanning device to cause a light beam to scan a media comprising a light source to project said beam along an optical axis, a distributor to displace radially said beam from said first optical axis and project the beam along a second optical axis substantially parallel to said first optical axis, a carrier having an optical element mounted thereon to receive said beam from said distributor and to control impingement of said beam on said media, said carrier being rotatable about an axis coincident with said first optical axis and said distributor being rotatable about an axis displaced from said optical axis and means to maintain said optical element coincident with said second optical axis as said carrier and distributor rotate and move said light beam across said media.

By separating the axis of rotation of the carrier and the light distributor, the optical element, typically a lens, mounted on the carrier may rotate about the optical axis of the light beam and so is always illuminated by the optical beam in its central zone. Movement of the beam across the lens is minimized.

It is preferred that multiple distributors and optical elements are utilized to provide successive scans of the media as the scanner rotates through 360 degrees.

BRIEF DESCRIPTION OF THE DRAWINGS

Embodiments of the invention will now be described by way of example only with reference to the accompanying drawings in which.

DETAILED DESCRIPTION OF THE DRAWINGS

Figure 1:
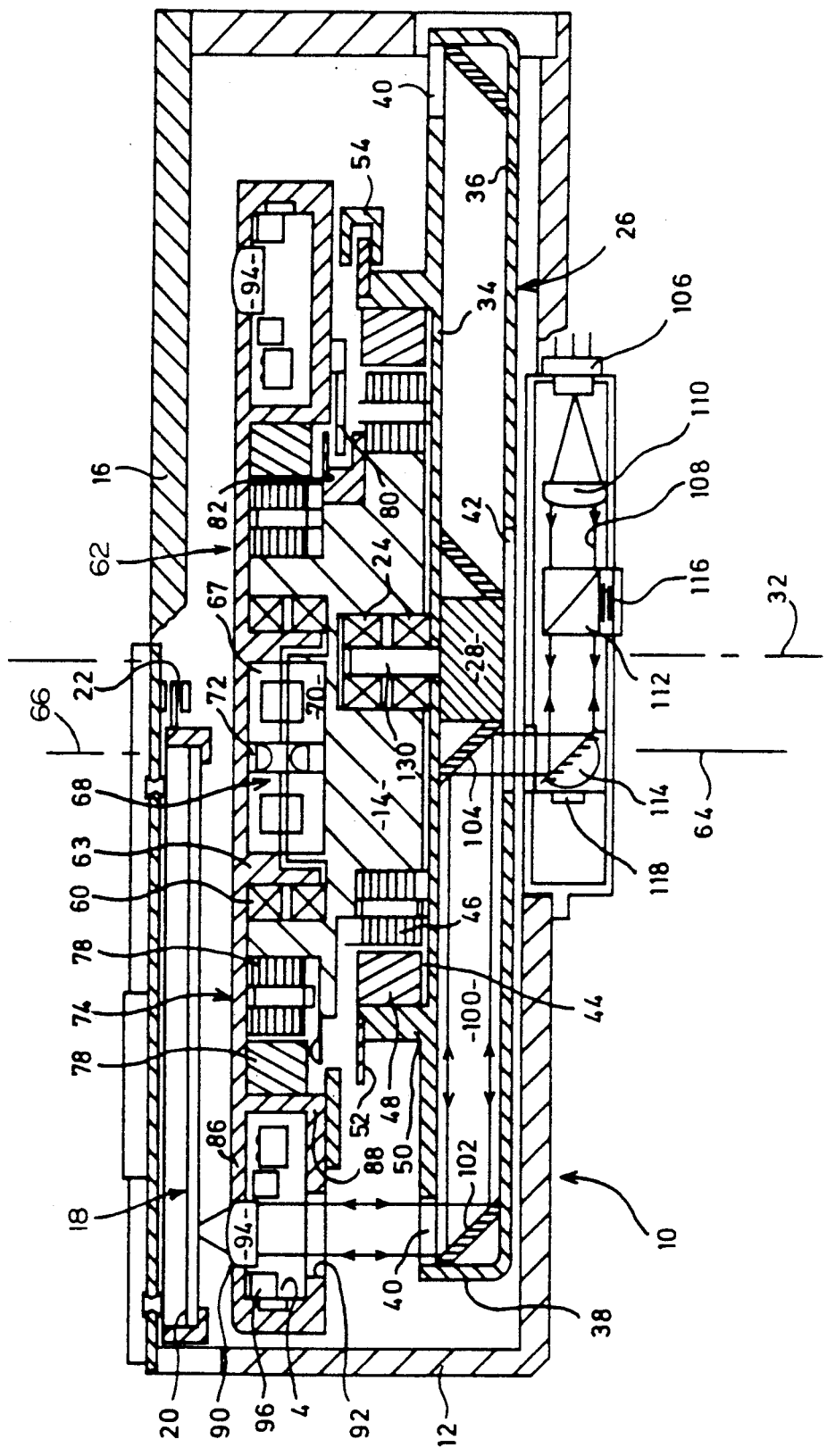
FIG. 1 is a sectional view of a optical scanner.

Referring therefore to FIG. 1, an optical scanner generally designated (10) includes a housing (12) with a support frame (14) extending between the side walls of the housing (12). The housing (12) includes an upper closure member (16) that carries a card transport mechanism generally indicated at (18). As shown in FIG. 1, the card transport mechanism (18) is designed to accomodate an optically recordable and readable card (20) and is supported in the transport mechanism (18) for incremental movement in the direction indicated by arrow A. The location of the card (20) is monitored by a position encoder (22). The specific details of the card transport mechanism do not form part of the present invention and will therefore not be described further.

The frame (14) rotatably supports an optical beam distribution assembly generally designated (26) through bearings (24). The assembly (26) comprises a central hub (28) having a spindle (30) receive the bearings (24)

so as to be rotatable about an axis (32). The distributor assembly (26) further comprises upper and lower spaced disk members (34)(36) respectively, mounted on opposite sides of the hub (28). The lower disk member (36) has an upturned peripheral flange (38) extending to the upper disk member (34). Disk member (34) has four notches (40) uniformly distributed around its periphery and the lower disk member (36) includes a central aperture (42) co-axial with the hub (28) so that the lower disk member (36) is in fact supported by the upper disk member (34).

The disk assembly (26) is rotated by a motor (44) disposed between the frame (14) and the upper disk member (34). The motor (44) includes a winding assembly (46) secured to the frame (14) and a magnetic core (48) secured to an upstanding annular flange (50) on the upper surface of the disk member (34). A radial extending encoder disk (52) is secured to the flange (50) and co-operates with a detector assembly (54) to monitor the rotation of the disk assembly (26) relative to the frame (14).

The frame (14) also rotatably supports on bearings (60) a circular carrier assembly indicated generally at (62). The carrier assembly (62) includes a downwardly-projecting annular shoulder (63) engaging the bearing (60) to locate the assembly (62) for rotation about an axis (64). Located within the shoulder (63) is the secondary winding (67) of a rotary transformer generally indicated at (68). The primary winding (70) is located on the frame (14). An opto-electric coupling (72) is located at the centre of the primary and secondary windings (70)(67) respectively on the axis (64). The rotary transformer (68) permits power to be transferred from the stationery frame (14) into the rotating carrier assembly (62) and similarly the opto electric coupling (72) permits data to be transferred between the stationery and rotating components.

Rotation of the disk assembly (62) is provided by a motor (74) with the windings (76) located on the frame (14) and the magnetic core (78) secured to the disk assembly (62). Rotational control of the disk assembly (62) is provided by an encoder ring (80) secured to the disk assembly (62) and a detector assembly (82) secured on the frame (14).

A cavity (84) of rectangular cross-section is formed on the periphery of the disk assembly (62) with spaced upper and lower surfaces (86)(88) respectively. Aligned apertures (90)(92) are formed in the upper and lower surfaces (86)(88). A lens (94) is mounted by means of a focusing servo (96) in the aperture (90) and is movable in a direction normal to the plane of the disk assembly (62) to effect focusing on the card (20) in response to data signals provided through the opto-electric link (72).

The lens (94) receives light from one of four distributors (100) mounted on the distributor assembly (26) and uniformly distributed about the assembly (26) at 90 degree intervals. Each distributor (100) comprises a pair of planar mirrors (102)(104) that are arranged parallel to one another and are disposed 45 degrees to the axis of rotation (32) of the distributor (26). A coherent light beam is provided to the distributor (100) from a laser diode (106) that emits a light beam indicated at (108) and passes through a columnating lens (110) and beam splitter (112) to a galvanometer mirror (114). The galvanometer mirror (114) is disposed at 45 degrees to the axis of rotation (64) of the carrier (62) and is rotatable about an axis orthoganal to the axis (64). The optical beam (108) is thus reflected by the mirror (114) along an optical axis co-incident with the axis of rotation (64) of the carrier (62) and onto the mirror (104). Light reflected from the record (20) is received at a photo detector (116) that converts the light signal into an electrical signal. The detector (116) also provides a tracking signal to a servo motor (118) that controls movement of the galvanometer mirror (114) to effect tracking of the light beam (108) on the record (20).

In operation, the distributor assembly (26) and carrier assembly (62) are rotated about their respective axes (32)(64) by motors (44)(74) respectively. The rotation is controlled by means of the encoders (52)(80) and their respective pickups (54)(82) so that they rotate at the same angular velocity. Comparison of the outputs of pickups (54)(82) provide an error signal that is used to adjust the rotation of one of the assemblies and maintain it in synchronism with the other assembly both as to relative velocities and position.

Figure 2:
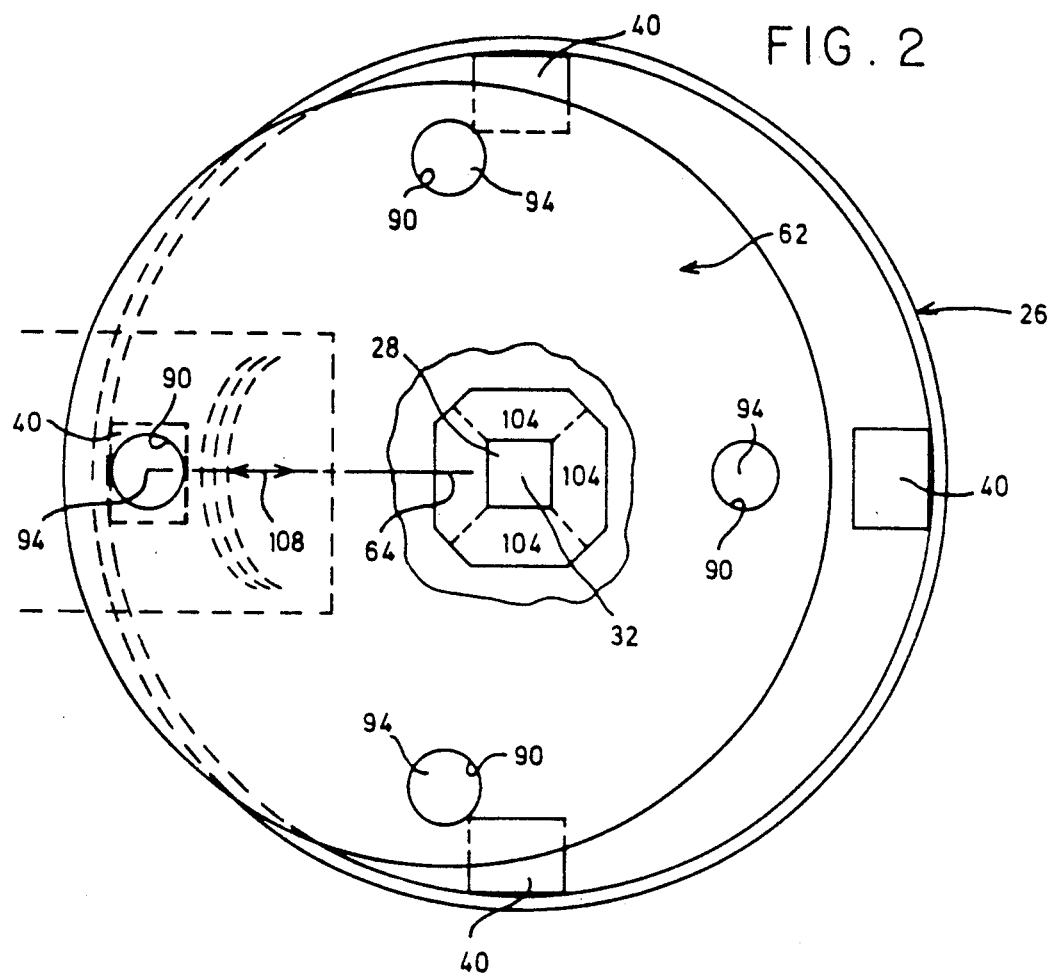
FIG. 2 is a plan view of the device shown in FIG. 1 taken on the line 2—2.
Figure 3:
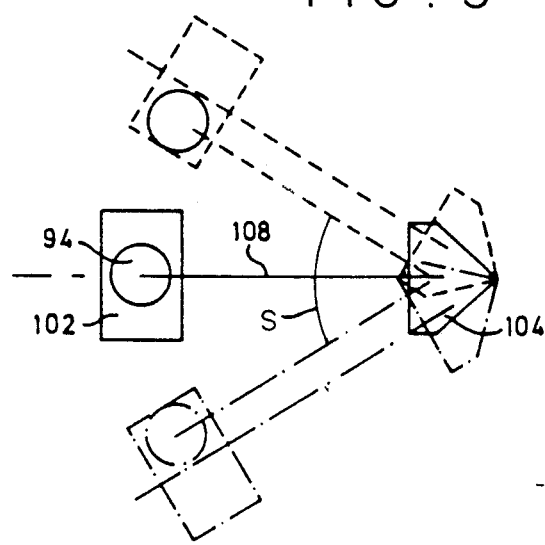
FIG. 3 is a schematic representation of a portion of the device shown in FIG. 2 showing alternative positions of the elements during movement of the scanner.

As may best be seen in FIG. 2, the distributor assembly (26) and carrier assembly (62) are arranged so that over an arc of rotation indicated by the arc "S" in FIG. 3, the aperture (92) in the carrier assembly (62) overlies the aperture (40) in the distributor assembly (26). In the embodiment shown, the arc "S" subtends an angle of approximately 60 degrees although this may vary according to application. Over the arc "S", the mirror (104) and lens (94) are thus aligned so that light reflected from the mirror (102) passes through the lens (94) onto the record (20). In order to record data on the record (20), assuming it is a recordable media, the laser (106) is modulated by a digital data stream and a correspondingly modulated optical beam passes through the lens (110) and beam splitter (112) to be reflected by the galvanometer mirror (114) along the optical axis co-incident with the axis (64). The optical beam is reflected and radially displaced by the mirror (104) in the distributor (100) and is subsequently reflected by the mirror (102) along an optical axis radially spaced but parallel to the axis (64). The optical beam passes through the aperture (40) in the distributor assembly (26) and aperture (92) in the carrier assembly (62) to impinge on the lens (94) and be focused onto the record (20). As the beam moves across the record (20) due to rotation of the distributor (100) and lens (94), the incident radiation modulates the light-sensitive record (20) to record in an arcuate track a digital data stream corresponding to that provided to the laser (106).

In order to read data from the record (20), the laser (106) maintains a continuous light beam which is fed along the same optical path to illuminate the surface of the record (20). The digital data recorded on the record (20) as reflective and non-reflective areas modulates the light beam which passes back along the same optical path to be diverted by the beam splitter (112) into the detector (116). The detector (116) converts the modulated light beam into an electrical signal to reconstruct the data recorded on the record (20).

Figure 4:
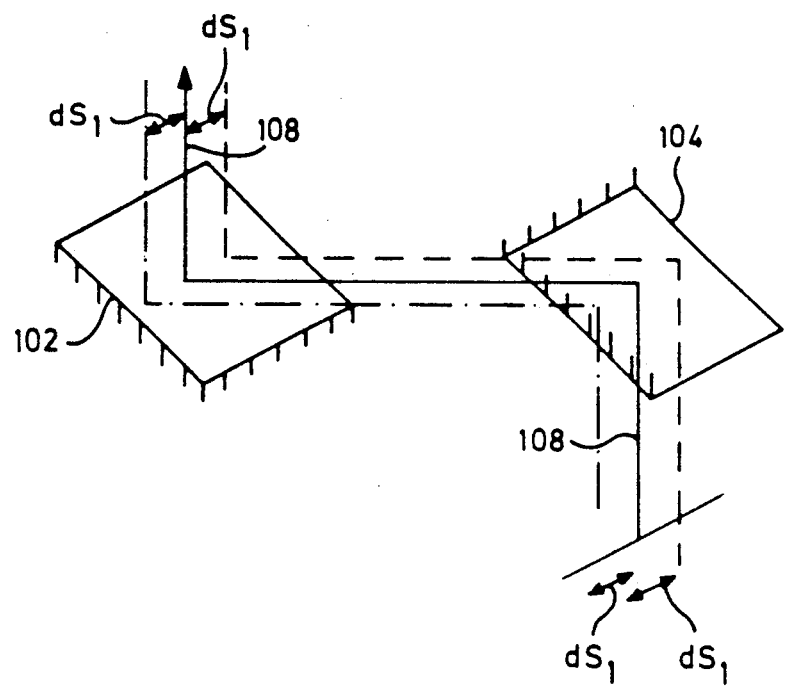
FIG. 4 is a perspective view of the elements shown in FIG. 3 showing alternative light transmission paths.

The position of the carrier (62) relative to the distributor assembly (26) ensures that the light beam incident on the lens (94) remains in the central zone of the lens (94) as it passes through the arc "S". As may be seen in FIGS. 3 and 4, the distributor (100) provides a pair of spaced parallel reflective surfaces and it is characteristic of such an arrangement that a displacement of a light source relative to one surface results in a corresponding and equal displacement of the optical beam reflected by the other surface. Thus, as shown in FIG. 4, a lateral displacement $dS_1$ of the optical beam relative to the mirror (104) produces a corresponding lateral displacement $dS_1$ at the mirror (102). As the mirror (104) rotates with the hub (28) of the carrier assembly (26), the optical beam progressively moves across the mirror (104) with a corresponding displacement of the optical beam relative to the mirror (102). If, as shown in the prior art referred to above, the lens (94) rotates about the same axis as the distributor (26), a similar lateral displacement of the beam relative to the lens (94) would occur, resulting in the periphery of the lens (94) being illuminated. By contrast, in the arrangement described in FIGS. 1-4, the lens carrier (62) is caused to rotate about the axis (64) which is co-incident with the optical axis of the light beam co-incident on the mirror (104). As such, the optical beam (108) originates at the centre of rotation of the lens (94) and is substantially co-incident over the arc "S" with the central zone of the lens (94). By virtue of the complementary lateral displacements of the beam (108) by the mirrors (104)(102), the optical axis of the beam (108) that impinges on the lens (104) remains at the axis of rotation (64) of the carrier assembly (62) and thereby remains substantially constant within the centre of the lens (94). The optical beam therefore traces an arcuate path across the surface of the record (20) with successive lenses (94) generating successive arcs. The card (20) is moved incrementally between successive passes of the lenses (94) to allow for separation of the data tracks.

The focusing of the beam (108) on the record (20) is provided by the focusing actuator (96) that utilizes control signals derived from the detector (116) in conventional manner and provided through the opto-electric coupler (72). Similarly, the tracking of beam (108) across the surface of the card (20) may be adjusted by the galvanometer mirror (114) operating through the servo motor (118) from control signals derived from the detector (116). Rotation of the mirror (114) changes the angle of incidence of the optical axis on the mirror (104) and produces a corresponding inclination of the beam (108) to the lens (94) which causes radial displacement of the focal point of the beam relative to lens (94) and record (20). This permits adjustment of the beam to compensate for variations between cards and their mounting within the transport mechanism (18). Such displacement is also constant relative to the card over the scan of the beam (108) to simplify tracking. As an alternative to the tracking mirror (114), it is possible to control both focus and tracking through actuator (96) which would tilt lens (94) to move radially the focal point of the beam (108).

Similarly, the tracking signal could be provided by a beam splitter located on the carrier in the path of the beam (108) and associated detector to measure the energy distribution of the beam (108) and adjust its position accordingly.

It will be seen, therefore, that providing the carrier assembly (62) with an axis of rotation co-incident with the optical axis and displaced from the axis of rotation of the distributor (26) a simple yet effective mechanism is provided which maintains the optical beam in the central zone of the lens (94) as the assembly passes through the scanning arc.

Figure 5:
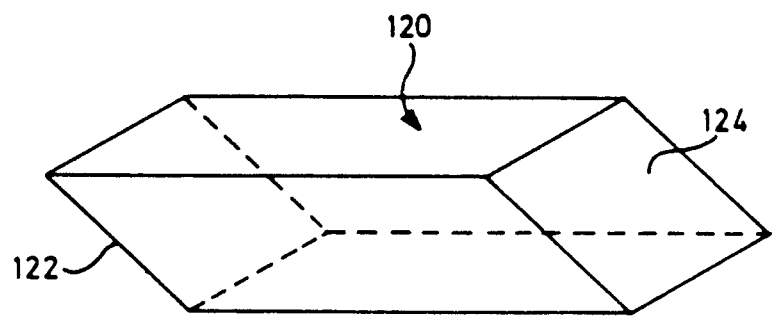
FIG. 5 is a view similar to FIG. 4 showing an alternative embodiment of the elements shown in FIG. 4.

It will be apparent that alternative arrangements may be provided for the distributor (100) and in particular the pair of mirrors (102)(104) may be replaced by a parallelpiped prism (120) as shown in FIG. 5 with inclined end faces (122),(124) to deflect the beam (108).

Moreover, such a prism could be formed as an integrally molded spider with four or more arms to reduce the manufacturing costs of the assembly. An alternative arrangement of scanner is shown in FIG. 6 in which light components have been identified with light reference numerals with the suffix "a" added for clarity.

Figure 6:
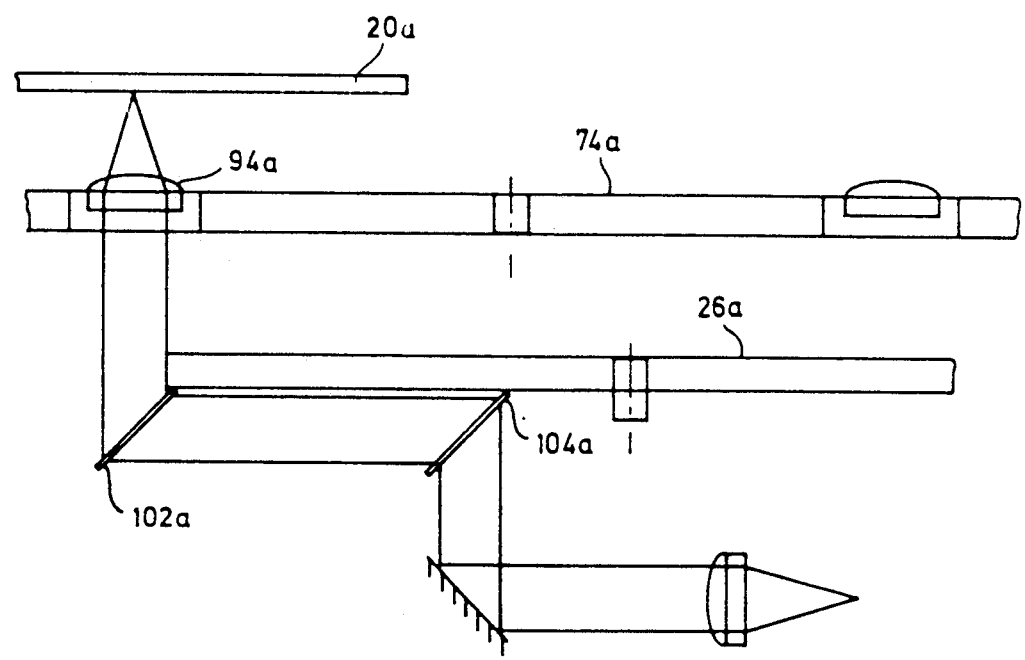
FIG. 6 is a schematic representation of an alternative form of scanner.

In the embodiment of FIG. 6, the mirrors (102)(104) are replaced with holograms (102a)(104a) disposed 45 degrees to the incident light beam (108a). An optical path equivalent to that obtained with the mirrors (102)(104) is produced to maintain illumination of the lens (94a).

The use of holographic transmissive elements leads to a slight reduction in the energy transmission but does make the device more tolerant to minor misalignments during manufacture.

We claim:

1. A rotary optical scanner to cause a light beam to scan a media comprising a light source to project said beam along a first optical axis to impinge on a distributor, said distributor to displacing radially said beam from said first optical axis and projecting the beam along a second optical axis substantially parallel to said first optical axis, a carrier having an optical element mounted thereon to receive said beam from said distributor and to control impingement of said beam on said media, said carrier being rotatable about an axis coincident with said first optical axis and said distributor being rotatable about an axis displaced from said first optical axis and means to maintain said optical element coincident with said second optical axis as said carrier and distributor rotate and move said light beam across said media.

2. A scanner according to claim 1 wherein the axes of rotation of said carrier and said distributor are parallel.

3. A scanning device according to claim 2 wherein said distributor includes a pair of radially spaced light deflection means arranged so that a displacement of said first optical axis relative to one of said light deflection means causes a corresponding and equal displacement of said second optical axis relative to the other of said light deflection means.

4. A scanning device according to claim 3 wherein said carrier and distributor rotate with a common angular velocity to maintain said second optical axis coincident with said optical element.

5. A scanning device according to claim 4 wherein said pair of light deflection means are planar reflective surfaces.

6. A scanning device according to claim 5 wherein said planar surfaces are inclined end faces of a parallelopiped prism.

7. A scanning device according to claim 5 wherein said planar surfaces are mirrors.

8. A scanning device according to claim 4 wherein said light deflection means are holograms.

9. A scanning device according to claim 3 including light beam displacement means located between said source and said distributor and operable to adjust the impingement of said beam on said first deflection means and thereby adjust the radial position of the light beam on said media to effect tracking of said beam on said media.

10. A scanning device according to claim 9 wherein said pair of light deflection means are planar reflective surfaces.

11. A scanning device according to claim 9 wherein said optical element is adjustably positioned on said carrier to control focusing of said beam on said media.

12. A scanning device according to claim 11 wherein the position of said optical element is controlled by an actuator and control signals for said actuator are transmitted to said carrier by an opto-electronic link positioned on the axis of rotation of said carrier.

13. A scanning device according to claim 1, and further comprising a plurality of optical elements which are uniformly distributed about the carrier and a plurality of distributors, each of said distributors being associated with one of said plurality of optical elements.

14. A scanning device according to claim 13 wherein said plurality of distributors are integrally formed as a common unit.

* * * * *